United States Patent
Lin et al.

(10) Patent No.: US 8,862,278 B2
(45) Date of Patent: Oct. 14, 2014

(54) POWER SUPPLY THERMAL PROFILE SELECTION MANAGEMENT

(71) Applicant: International Business Machines Corporation, Armonk, NY (US)

(72) Inventors: Jen-Ching Lin, Apex, NC (US); Randhir Singh Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/101,347

(22) Filed: Dec. 10, 2013

(65) Prior Publication Data

US 2014/0094986 A1    Apr. 3, 2014

Related U.S. Application Data

(63) Continuation of application No. 13/153,446, filed on Jun. 5, 2011, now abandoned.

(51) Int. Cl.
G06F 19/00     (2011.01)
G05D 23/19    (2006.01)
G06F 1/20      (2006.01)

(52) U.S. Cl.
CPC ............... G05D 23/19 (2013.01); G06F 1/206 (2013.01); G05D 23/1934 (2013.01)
USPC .......................................... 700/286; 361/611

(58) Field of Classification Search
USPC ................................................ 700/286, 149
See application file for complete search history.

(56) References Cited

U.S. PATENT DOCUMENTS 5,796,580 A     8/1998  Komatsu
7,644,051 B1 *  1/2010  Moore et al. .................... 706/21

(Continued)

FOREIGN PATENT DOCUMENTS

JP      2009/170649 A    7/2009
WO   WO2010017429 A2   2/2010

OTHER PUBLICATIONS

Soldano—"Power Monitoring in Server Power Supplies—Challenges and Opportunities", Analog Devices—IBM 2007 Power and Cooling Symposium—Raleigh, NC, pp. 1-22 (2007).

(Continued)

Primary Examiner — Kidest Bahta
(74) Attorney, Agent, or Firm — David Mims; Mark P Kahler

(57) ABSTRACT

An electronic system employs multiple power supplies that provide electrical energy to components of the server system. Each power supply exhibits or experiences a uniquely different air flow within the system chassis. Different air flows correspond to different component temperatures for each power supply. Each power supply stores a collection of selectable thermal profiles that determine cooling element control within the power supply. Each thermal profile may correspond to a different physical location within the system. Thermal profiles provide each power supply with local environmental response correlations, such as between local power supply temperature and cooling fan speed. The power supply selects a particular thermal profile in response to determining the power supply's physical location in the system. The power supply instructs the cooling fan to provide an amount of cooling dependent on both the selected thermal profile and a sensed local environmental condition such as temperature.

13 Claims, 6 Drawing Sheets

(56) References Cited

U.S. PATENT DOCUMENTS

| | | | |
|---|---|---|---|
| 7,644,148 B2* | 1/2010 | Ranganathan et al. | 709/223 |
| 7,676,280 B1* | 3/2010 | Bash et al. | 700/17 |
| 8,249,841 B1* | 8/2012 | Ferrer et al. | 703/9 |
| 2006/0259621 A1* | 11/2006 | Ranganathan et al. | 709/226 |
| 2010/0001742 A1 | 1/2010 | Ahmed | |
| 2010/0083018 A1 | 4/2010 | Park | |

OTHER PUBLICATIONS

Uzuka—"Power Supply, Cooling and Mechanical Technologies for Green IT", Fujitsu Science and Technology, vol. 47, No. 2, pp. 157-163 (Apr. 2011).

I2C—"I2C Bus Specification and User Manual", NXP Semiconductors, pp. 1-50 (Jun. 2007).

* cited by examiner

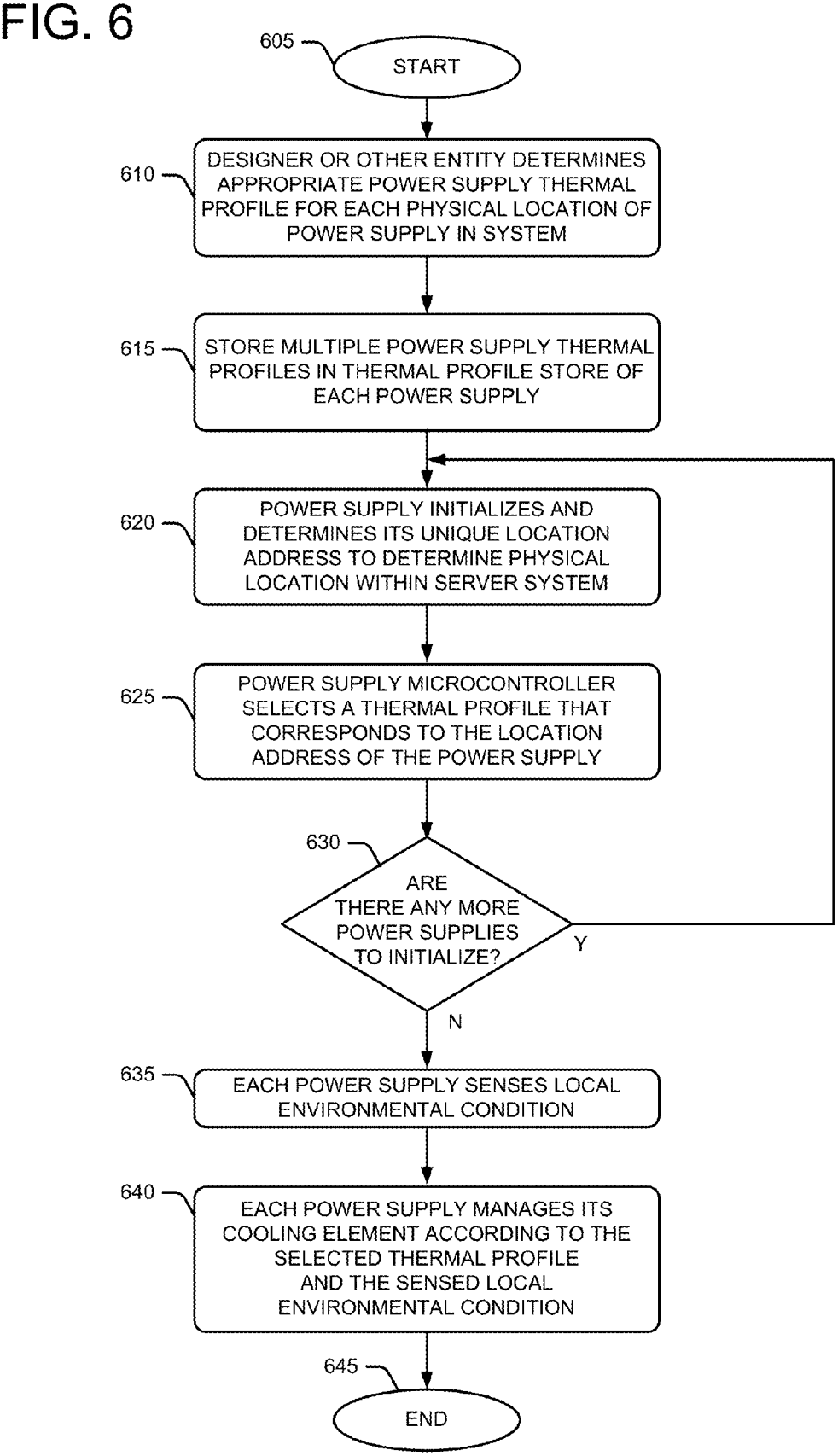

POWER SUPPLY THERMAL PROFILE SELECTION MANAGEMENT

CROSS REFERENCE TO RELATED APPLICATIONS

This patent application is a continuation of, and claims priority to, the U.S. patent application entitled "POWER SUPPLY THERMAL PROFILE SELECTION MANAGEMENT", inventors Jen-Ching Lin, et al., application Ser. No. 13/153,446 filed Jun. 5, 2011, that is assigned to the same Assignee as the subject patent application, the disclosure of which is incorporated herein by reference in its entirety.

BACKGROUND

The disclosures herein relate generally to information handling systems (IHSs), and more specifically, to management of power supply thermal profiles in an IHS.

Information handling systems (IHSs) typically employ power supplies to provide electrical energy to electrical loads of the IHS. A server or server system may include multiple IHSs and employ multiple power supplies in one server chassis or housing. Cooling such a multiple power supply IHS presents many challenges.

BRIEF SUMMARY

In one embodiment, a method of operating a power supply is disclosed. The method includes sensing, by the power supply, a location address that corresponds to a physical location of the power supply within an electronic system, thus providing a sensed location address. The electronic system includes a plurality of power supply locations with respective location addresses. The method also includes selecting, by the power supply, one of a plurality of thermal profiles based on the sensed location address to provide a selected thermal profile. The method further includes sensing, by the power supply, a local environmental condition of the power supply, thus providing sensed local environmental condition information. The method still further includes activating, by the power supply, a cooling element associated with the power supply in response to the selected thermal profile and the sensed local environmental condition. The power supply instructs the cooling element to provide an amount of cooling dependent on both the selected thermal profile and the sensed environmental condition.

In another embodiment, the disclosed method includes sensing, by each power supply of a plurality of power supplies in an electronic system, a respective location address that corresponds to a physical location of each power supply within the electronic system, each power supply thus exhibiting a sensed location address. The method also includes selecting, by each power supply, one of a plurality of thermal profiles based on the sensed location address of each power supply to provide a respective selected thermal profile for each power supply. The method further includes sensing, by each power supply, a respective local environmental condition of each power supply, thus providing a respective sensed local environmental condition information for each power supply. The method still further includes activating, by each power supply, a respective cooling element associated with each power supply in response to the respective selected thermal profile and the respective sensed local environmental condition of each power supply, each power supply instructing the respective cooling element to provide an amount of cooling dependent on both the selected thermal profile and the sensed environmental condition for each power supply.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 6 is a flowchart of representative process flow in one embodiment of the disclosed power supply thermal profile selection method.

DETAILED DESCRIPTION

Figure 1:
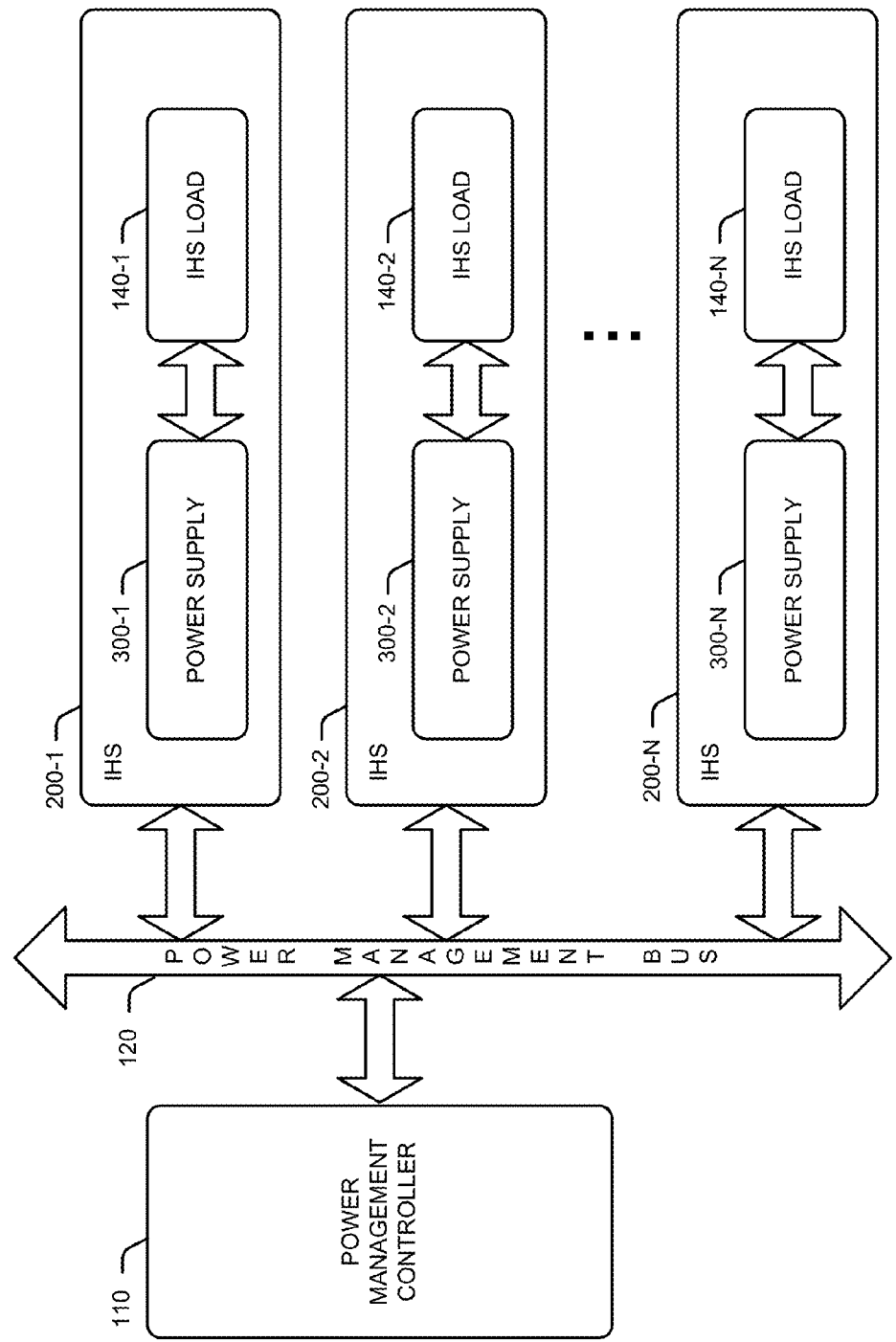
FIG. 1 shows a block diagram of a representative server system that includes information handling systems (IHSs) that employ the disclosed power supply thermal profile selection methodology.

Servers or server systems may employ multiple information handling systems (IHSs) that execute applications and other processes. Each IHS of the server system requires electrical energy to supply electrical loads within each IHS. Each IHS may employ one or more power supplies to provide electrical energy to that IHS or other IHSs within the server system. Power supply components typically exhibit significant temperature increases during operation. Maintaining power supply components at lower temperatures increases the life of those components and the power supplies they form. Each power supply may employ a fan, cooling element, or other cooling apparatus to cool the power supply components during normal operation. Each power supply within the server system exhibits unique thermal characteristics due to environmental factors, such as air flow impedance, back pressures, air flow distances, electrical loads and other factors. Power supplies in the server system may employ thermal profiles, i.e. cooling profiles, to manage power supply fans, cooling elements, or other temperature controlling components in a manner that improves power supply cooling performance.

The server system may include a server chassis or housing, such as a rack-mount server chassis. A designer may distribute or position server components throughout the server chasses in a manner that affects the distribution of air flow within the server chassis. In such a server system that includes multiple power supplies, each supply may exhibit different air flow characteristics that correspond to the air flow through that power supply. For example, one power supply may exhibit a low restricted air flow whereas another power supply may exhibit a highly restricted air flow. A power supply exhibiting a low restricted air flow may operate cooler than a power supply exhibiting a highly restricted air flow unless each power supply uses different fan speeds or other cooling methods.

In one embodiment, each power supply stores and manages internal or local thermal profiles. These thermal profiles may provide speed or revolutions per minute (RPM) control of their respective cooling fan motors or cooling elements. In this manner, each power supply may control an effective method of self cooling or thermal management. Designers may take into account server chassis air flow characteristics, as well as the air flow characteristics of each particular power supply, when developing thermal profiles for each particular power supply. Thermal profiles may take into account air flow impedances, air flow distances, air flow volumes, pressure changes, and other factors that may be location dependent variables for a particular power supply within the server system.

In one embodiment of the disclosed power supply thermal profile selection methodology, a power supply may select a particular thermal profile from multiple thermal profiles within a local thermal profile store. A particular power supply may detect or sense its physical location within the chassis of the server system. From this sensed location address information, the particular power supply may determine a particular thermal profile for selection from its stores. In more detail, the particular power supply selects the thermal profile that best matches the air flow characteristics of the particular power supply's physical location within the chassis of the server system.

Designers or other entities may determine the above-discussed thermal profile characteristics from empirical or theoretical methods. For example, a designer may measure or otherwise observe power supply air flow and cooling characteristics in various physical locations with the server system and generate cooling or thermal profiles experimentally to compensate for those environmental characteristics during real server system operations.

Alternatively, designers may generate thermal profiles from calculations or computer simulations. For example, designers may employ computer models or simulation of server system chassis characteristics that include air flow and other environmental characteristics. Modeling programs may derive thermal profiles from these computer models that simulate real server systems. In one embodiment, each power supply of a server system stores the same collection of thermal profiles within its respective power supply thermal profile store. A particular power supply may automatically select a corresponding appropriate thermal profile by accessing location dependent information such as a sensed location address or bus address of the particular power supply. By determining its own physical location within the server system in this manner, the particular power supply may in response select an appropriate corresponding thermal profile from that power supply's thermal profile store.

FIG. 1 is a block diagram of a representative server system 100 that employs the disclosed power supply thermal profile selection methodology. Server system 100 includes multiple information handling systems (IHSs) described in greater detail below. Server system 100 employs a power management controller 110 that manages power supplies and other power related functions within the server. Power management controller 110 couples to a power management bus 120. Power management bus 120 may be an Inter-IC (I²C) bus, System Management Bus (SMBus), or other communication bus within server system 100. (I²C—bus is a trademark of NXP B.V.) In one embodiment, power management bus 120 may extend outside of server system 100 to communicate with external server components or other IHSs (not shown).

Server system 100 includes multiple IHSs such as IHS 200-1, IHS 200-2, . . . IHS 200-N, wherein N represents the total number of IHSs within server system 100. IHS 200-1 includes an IHS load 140-1 that couples to a power supply 300-1. As used herein, the term "IHS load" refers to the power-consuming components of an IHS other than the power supply. For example, IHS load 140-1 may include a processor, memory, storage drives and other IHS components that consume power, as discussed in more detail with reference to FIG. 2. Power supply 300-1 provides electrical energy and other power services, such as power supply status information, to IHS load 140-1. IHS 200-1 couples via power management bus 120 to power management controller 110 to enable communication between IHS 200-1 and power management controller 110, as well as other components of server system 100.

Power supply 300-2 provides electrical energy and other power services, such as power supply status information, to IHS load 140-2 and to other IHS 200-2 components (not shown). IHS 200-2 couples via power management bus 120 to power management controller 110 to provide communication between IHS 200-2 and power management controller 110, as well as other components of server system 100. Power supply 300-N provides electrical energy and other power services, such as power supply status information, to IHS load 140-N and to other IHS 200-N components (not shown). IHS 200-N couples via power management bus 120 to power management controller 110 to provide communication between IHS 200-N and power management controller 110, as well as other components of server system 100. In one embodiment, N is the total number of IHSs, CPUs, and power supplies within server system 100.

Figure 2:
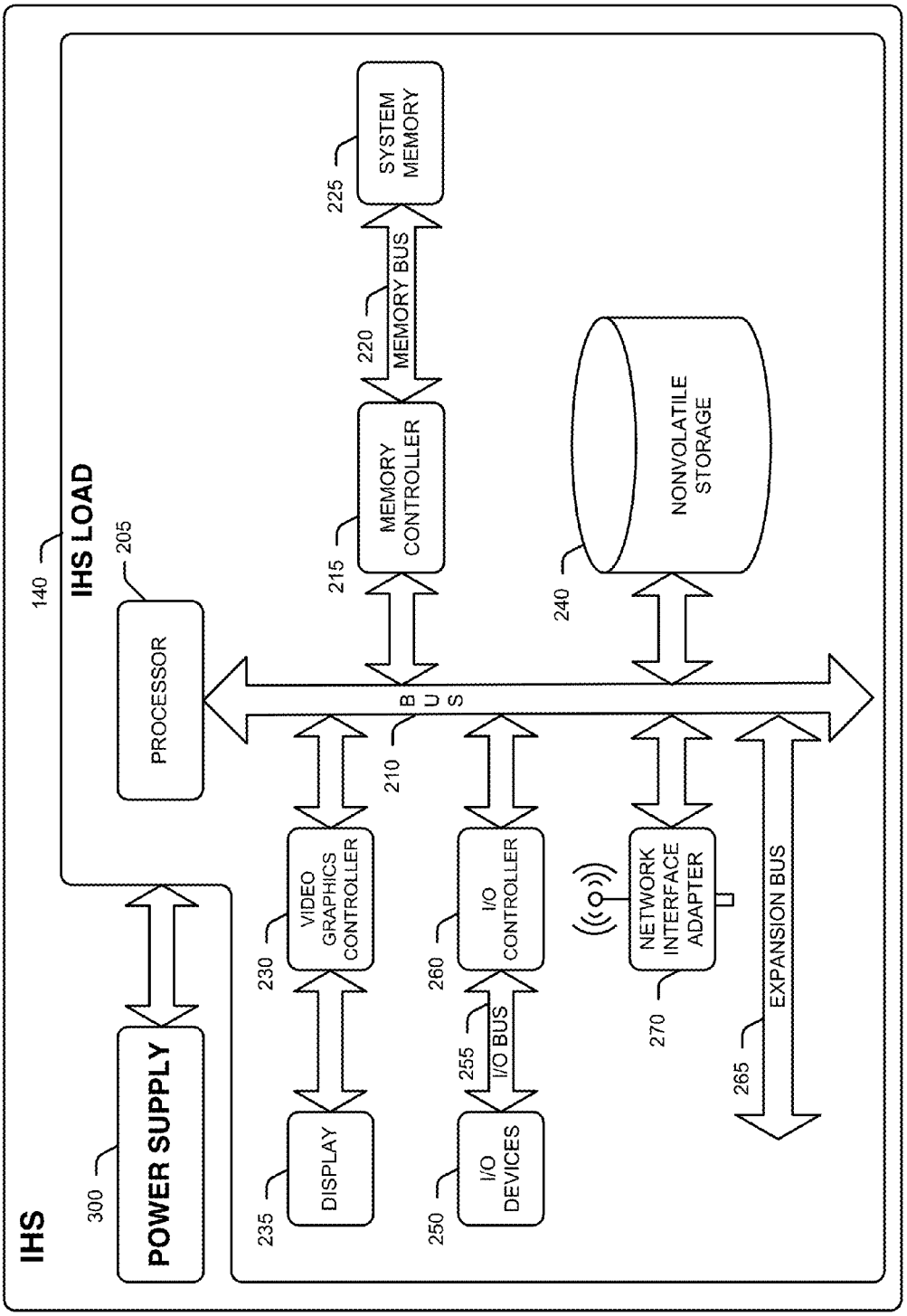
FIG. 2 depicts a block diagram of a representative information handling system (IHS) that employs the disclosed power supply thermal profile selection methodology.

FIG. 2 shows a representative information handling system (IHS) 200 that is suitable for use as IHS 200-1, IHS 200-2, . . . IHS 200-N of FIG. 1. IHS 200 includes a power supply 300 that practices the disclosed power supply thermal profile selection methodology. Power supply 300 supplies power to an IHS load 140 that the components of IHS 140 discussed below together form. IHS 200 includes a processor 205 that is part of IHS load 140. In one embodiment, processor 205 may include multiple processors cores (not shown). IHS 200 processes, transfers, communicates, modifies, stores or otherwise handles information in digital form, analog form or other form. Power supply 300 couples to and provides electrical energy to components of IHS 200, such as processor 205. In one embodiment, power supply 300 may represent more than one power supply that combine to provide electrical energy to multiple components of IHS 200. IHS 200 includes a bus 210 that couples processor 205 to system memory 225 via a memory controller 215 and memory bus 220. In one embodiment, system memory 225 is external to processor 205. System memory 225 may be a static random access memory (SRAM) array or a dynamic random access memory (DRAM) array. Bus 210, system memory 225, memory controller 215 and memory 220 form part of IHS load 140.

Processor 205 may also include local memory (not shown) such as L1 and L2 caches (not shown). A video graphics controller 230 couples a display 235 to bus 210. Nonvolatile storage 240, such as a hard disk drive, CD drive, DVD drive, or other nonvolatile storage couples to bus 210 to provide IHS 200 with permanent storage of information. I/O devices 250, such as a keyboard and a mouse pointing device, couple to bus 210 via I/O controller 260 and I/O bus 255. Video graphics controller 230, display 235, nonvolatile storage 240, I/O devices 250, I/O controller 260 and I/O bus 255 also form part of IHS load 140.

One or more expansion busses 265, such as USB, IEEE 1394 bus, ATA, SATA, PCI, PCIE, DVI, HDMI and other busses, couple to bus 210 to facilitate the connection of peripherals and devices to IHS 200. A network interface adapter 270 couples to bus 210 to enable IHS 200 to connect by wire or wirelessly to a network and other information handling systems. Network interface adapter 270 may also be called a network communication adapter or a network adapter. While FIG. 2 shows one IHS that employs processor 205, the IHS may take many forms. For example, IHS 200 may take the form of a desktop, server, portable, laptop, notebook, netbook, tablet or other form factor computer or data processing system. IHS 200 may take other form factors such as a gaming device, a personal digital assistant (PDA), a portable telephone device, a communication device or other devices that include a processor and memory. Expansion busses 265 and network interface adapter 270 also form part of IHS load 140.

Figure 3:
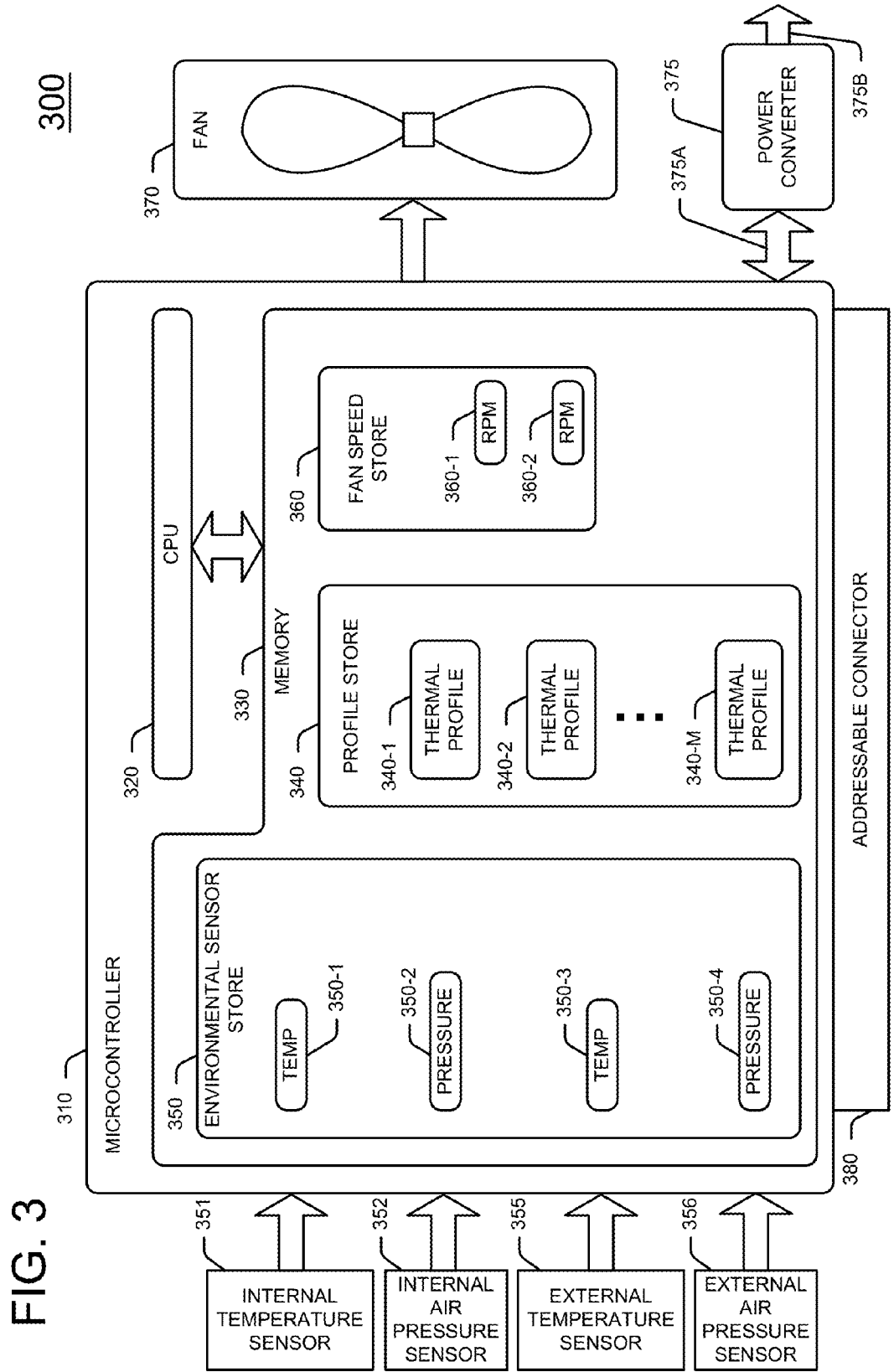
FIG. 3 shows a block diagram of a power supply that employs the disclosed power supply thermal profile selection methodology.

FIG. 3 is a block diagram of a power supply 300 that employs the disclosed thermal profile selection method. Power supply 300 includes a controller such as microcontroller 310 that includes a CPU 320 that provides power supply management, communications, as well as other features. For example, CPU 320 of microcontroller 310 may communicate with other components outside of power supply 300 through busses such as an I²C bus (not shown). CPU 320 couples to a memory 330. Memory 330 stores information that power supply 300 employs during power supply operations.

Memory 300 includes a thermal profile store 340. In one embodiment, profile store 340 stores power supply 300 thermal profile data in the form of memory stores. Profile store 340 includes a thermal profile 340-1, thermal profile 340-2, . . . thermal profile 340-M, wherein M is the total number of thermal profiles within profile store 340. Thermal profiles 340-1, 340-2, . . . 340-M may include information that provides power supply 300 with relationships between internal temperature and internal cooling or other power supply environmental information.

Memory 330 includes an environmental sensor store 350. Environmental sensor store 350 may employ multiple sensors that sense parameters internal to and external to power supply 300 such as temperature, pressure, humidity, air flow, as well as other parameters. Power supply 300 may employ the information within environmental sensor store 350 to detect and manage local environmental conditions, thus providing sensed local environmental conditions. In one embodiment, environmental sensor store 350 stores internal TEMP 350-1 data. TEMP 350-1 data includes temperature information from an internal temperature sensor 351 that couples to microcontroller 310. TEMP 350-1 data may include temperature readings of components internal to power supply 300, temperature of the air internal to power supply 300, or other internal temperature data.

Environmental sensor store 350 stores PRESSURE 350-2 data that includes internal air pressure information from an internal pressure sensor 352 that couples to microcontroller 310. Environmental sensor store 350 may also store external TEMP 350-3 data that includes information from an external temperature sensor 355 that couples to microcontroller 310. Temperature sensor 355 senses the temperature external to power supply 300. For example, temperature sensor 355 may sense the temperature external to power supply 300, but immediately outside of or adjacent to power supply 300. Environmental sensor store 350 may also store external PRESSURE 350-4 data that includes information from an external pressure sensor 356 that couples to microcontroller 310. Pressure sensor 356 senses the air pressure external to power supply 300. For example, pressure sensor 356 may sense the air pressure external to power supply 300, but immediately outside of, or adjacent to, power supply 300.

Internal temperature sensor 351 and internal pressure sensor 352 provide power supply 300 with internal environmental parameters, namely environmental parameters internal to power supply 300. Alternatively, external temperature sensor 355 and external pressure sensor 356 provide power supply 300 with external environmental parameters, namely environmental parameters external to power supply 300. External temperature sensor 355 and external air pressure sensor 356 may provide microcontroller 310 with possible effects from other components and components of server system 100. For example, external air pressure sensor 356 may provide pressure information such that one or more of power supplies 300 may determine air pressure drops or air pressure changes from outside to inside the power supply 300.

Microcontroller 310 couples to a fan 370 that cools power supply 300. Fan 370 acts as a cooling element for power supply 300. Memory 330 includes a fan speed store 360 that stores fan 370 speed information. In one embodiment, microcontroller 310 may modify the speed of fan 370, namely the revolutions per minutes (RPM) of fan 370, to increase or decrease air flow through power supply 300. This increase or decrease in air flow through the components of power supply 300 has a direct impact on the temperature of those power supply 300 components. By increasing the speed of fan 370 RPMs, power supply 300 may experience a decrease in temperature that may improve power supply 300 performance and longevity. Fan speed store 360 may store RPM data, such as RPM 360-1 data and RPM 360-2 data.

During operation of power supply 300, CPU 320 may interpret temperature data and fan 370 speed control data. For example, RPM 360-1 data may correspond to internal temperature TEMP 350-1 data. In other words, a particular fan speed that the RPM 360-1 data represents corresponds to a particular power supply internal temperature that the TEMP 350-1 data represents. RPM 360-2 data may correspond to the same internal temperature TEMP 350-1 data, as seen more clearly in the fan speed vs. temperature graph of FIG. 5, discussed below. The relationship between internal temperatures and fan 370 RPM speed measurements may provide one type of input into the development of thermal profiles, such as those within profile store 340. Power supply 300 includes a power converter 375 that couples to microcontroller 310. Power converter 375 includes a control input 375A and a DC power output 375B. Power converter 375 may be a switched-mode power supply, linear regulated power supply, or other form of power conversion supply.

Power supply 300 includes an addressable connector 380 that provides a sensed location address for power supply 300, the sensed location address of the power supply being dependent of the particular location among multiple locations that the power supply may exhibit within server system 100. In other words, each particular power supply within server system 100 may include its own addressable connector 380 that identifies a unique physical location of that particular power supply within server system 100. Addressable connector 380 may couple to a backplane (not shown) within server system 100 that may employ wiring or other methods to provide unique addressing information to power supply 300. A particular power supply 300 may employ any addressing scheme, including bus communications or other methods to determine the particular power supply 300 unique physical location information within server system 100. As described in more detail below, a particular power supply 300 may employ the sensed location address of that power supply to select a thermal profile within profile store 340 that best matches the thermal characteristics of the particular power supply physical location within server system 100.

Figure 4:
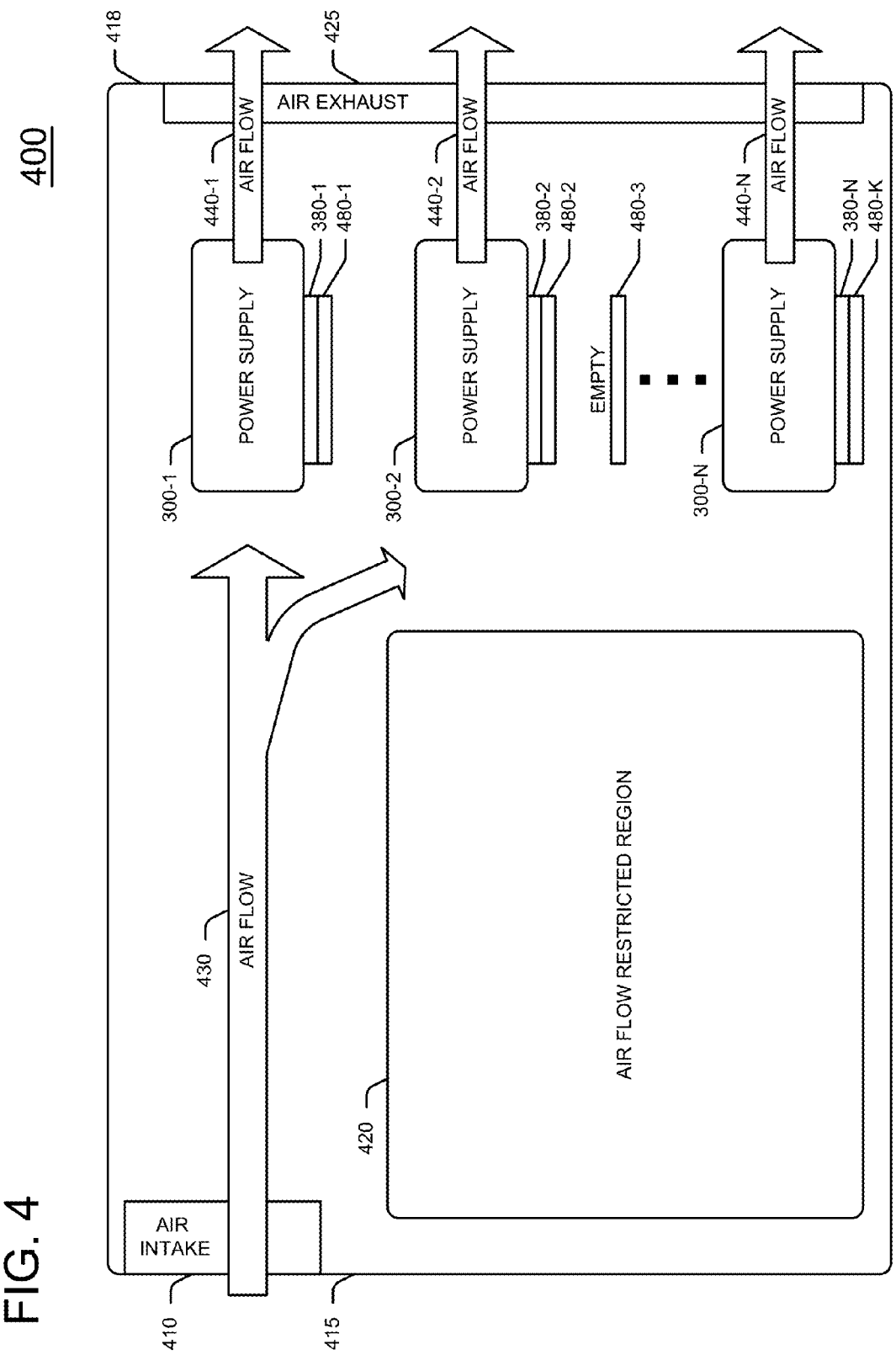
FIG. 4 shows a block diagram of a representative server chassis that demonstrates the disclosed power supply thermal profile selection methodology.

FIG. 4 is a block diagram that depicts a server chassis 400 of server system 100. FIG. 4 depicts one orientation and placement of power supplies and other server system 100 components within server chassis 400. Server chassis 400 may be a rack mount or other enclosure that houses server system 100 components. In one embodiment, server chassis 400 includes an air intake 410 and an air exhaust 425 as part of server system 100. Air flow may pass from a front region 415 of server chassis 400 at air intake 410 to a back region 418 of server chassis 400 at air exhaust 425.

Server chassis 400 may include server system 100 components that offer air resistance, such as some form of air flow restriction. Server chassis 400 includes air flow restricted region 420 as an example of this type of air resistance. One example of air flow, i.e. an air flow path, is shown by an air flow path 430. Air flow path 430 is shown by directional arrows that depict air flow from the front region 415 of server chassis 400 at air intake 410, around air flow restricted region 420, and toward the back region 418 of server chassis 400, namely air exhaust 425. Server chassis 400 includes power supplies 300-1, 300-2, . . . 300-N, wherein N is the total number of power supplies within server system 100 and server chassis 400. Each power supply within server chassis 400 exhibits a unique orientation with respect to air flow movement from air intake 410 to air exhaust 425. In other words, each particular power supply within server chassis 400 may exhibit a unique air resistance or air flow impedance that may correspond to a particular internal air flow through that particular power supply.

For example, power supply 300-1 exhibits an air flow 440-1 that corresponds to the flow of air through power supply 300-1 and out air exhaust 425. Power supply 300-2 exhibits an air flow 440-2 that corresponds to the flow of air through power supply 300-2 and out air exhaust 425. In a like manner, other power supplies (not shown) exhibit corresponding air flows up to and including power supply 300-N that exhibits an air flow 440-N as illustrated, wherein N is the total number of power supplies within server system 100 and server chassis 400. Each particular power supply of system chassis 400 exhibits a unique air flow that is dependent upon air flow restrictions, air flow volumes, fan 370 speeds, and other factors corresponding to that particular power supply and power supply location in the system chassis 400. Air flow characteristics may include air flow impedances, air flow volumes, and other factors that correspond to particular power supply locations in the system chassis 400. A particular power supply air flow distance may correspond to the distance the air travels from air intake 410 through the particular power supply and to air exhaust 425. The particular power supply may exhibit a unique air flow distance that corresponds to the particular power supply location within the system chassis 400.

In one embodiment, power supply 300-1 and power supply 300-2 may employ the same fan 370 speeds at their respective fans. However, in that case power, supply 300-1 and power supply 300-2 may exhibit different air flows. For example, power supply 300-1 may exhibit or experience a lower air flow restriction within system chassis 400 thus allowing a higher air flow volume, namely higher air flow 440-1 than the corresponding air flow 440-2 for power supply 300-2. Conversely, power supply 300-2 may exhibit or experience greater air flow restriction within system chassis 400 due to air flow restricted region 420 and exhibits a lower air flow volume, namely air flow 440-2 than air flow 440-1 of power supply 300-1. Again, this is the case wherein the power supply 300-1 and power supply 300-2 respective fan 370 speeds are identical.

To increase air flow 440-2 to an air flow similar to that of air flow 440-1, power supply 300-2 may increase fan 370 speed within power supply 300-2. In this manner, each power supply, namely power supply 300-1 and power supply 300-2, may maintain similar internal temperatures for their respective internal components. Each power supply within server system chassis 400 may monitor internal temperatures, such as by monitoring internal temperature sensor 351, and employ that and other information to determine the best local fan 370 speed.

The server chassis 400 includes multiple locations where a power supply may mount. For example, server chassis 400 may include a motherboard, backplane or other power supply receiving structure to which power supplies may mount. In one embodiment, each location where a power supply 300 is mountable includes an address connector 480 that mates with a corresponding address connector 380 of a respective power supply. In the particular example that FIG. 4 illustrates, each location where a power supply is mountable includes a respective address connector 480-1, 480-2, 480-3, . . . 480-K, wherein K is the total number of power supply mounting locations available. In the example of FIG. 4, address connector 480-3 is empty with no power supply at that location. However, address connector 380-1 of power supply 300-1 electrically and mechanically couples to corresponding address connector 480-1 that supplies a unique address code thereto. This unique address code identifies the physical location of address connector 480-1 within server chassis 400.

In a similar manner, address connector 380-2 of power supply 300-2 couples to corresponding address connector 480-2 that supplies a unique address code thereto that identifies the physical location of address connector 480-2 within server chassis 400. Address connector 480-3 is empty with no power supply at that particular location in this example. Address connector 380-N of power supply 300-N couples to corresponding address connector 480-K that supplies a unique address code thereto that identifies the physical location of address connector 480-K within server chassis 400. In this manner, server 100 provides a different unique address to each of address connectors 480-1, 480-2, . . . 480-K, and to corresponding power supplies 300-1, 300-2, . . . 300-N. In actual practice, power management controller 110 of server system 100 of FIG. 1 may serve as an address generator that provides different unique addresses to each of address connectors 480-1, 480-2, . . . 480-K.

Power supplies 300-1, 300-2, . . . 300-N may employ information within the thermal profiles of profile store 340 to manage fan 370 speed control in response to internal temperature readings or other data. In one embodiment, power supply 300-1 may employ addressable connector 380-1 to determine the unique location or sensed location address for power supply 300-1 within server chassis 400. Power supply 300-1 may employ this sensed location address as input to determine the best thermal profile, such as one of thermal profiles 340-1, 340-2, . . . 340-M, wherein M is the total number of thermal profiles in profile store 340. Power supply 300-1 may select thermal profile 340-1 as the thermal profile that best fits the low restricted air flow condition exhibited by power supply 300-1 in FIG. 4. In response to this selection, power supply 300-1 will regulate the speed of fan 370 and the resultant temperature of supply 300-1 in accordance with this selected thermal profile 340-1.

In a similar manner, power supply 300-2 may employ addressable connector 380-2 to determine the unique location or sensed location address for power supply 300-2 within server chassis 400. As discussed above, a different unique address corresponds to each possible power supply location, i.e. each address connector 480-1, 480-2, . . . 480-K in server chassis 400. Power supply 300-2 may employ this sensed location address as input to determine the best thermal profile, such as one of thermal profiles 340-1, 340-2, . . . 340-M. Power supply 300-2 may select thermal profile 340-2 as the thermal profile that best fits the highly restricted air flow condition depicted in FIG. 4. In response to this selection, power supply 300-2 will regulate the speed of fan 370 and the resultant temperature of supply 300-2 in accordance with this selected thermal profile 340-2. Each power supply within server chassis 400 may employ the same technique to select a corresponding thermal profile from profile store 340 that best fits each power supply's physical location.

Figure 5:
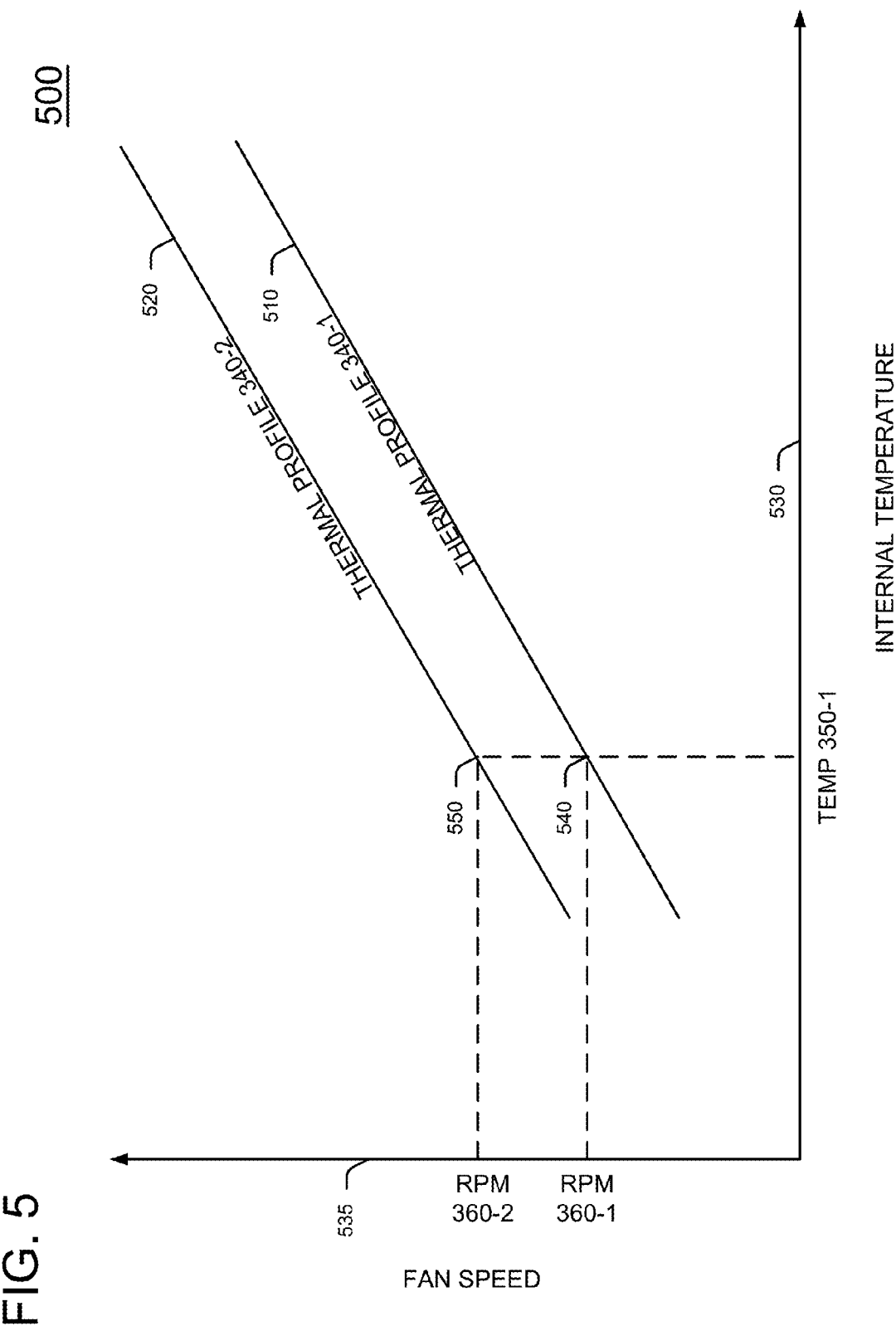
FIG. 5 shows a graph of power supply thermal profile information that demonstrates the disclosed power supply thermal profile selection methodology.

FIG. 5 is a thermal profile graph 500 that shows fan speed as a function of temperature. This particular graph shows thermal profile 340-1 as line 510 and further shows thermal profile 340-2 as line 520. As discussed above, profile store 340 stores thermal profiles 340-1 and 340-2. In actual practice, profile store 340 may store more than these two thermal profiles.

In more detail, thermal profile graph 500 shows internal temperature on the X axis 530 and fan speed on the Y axis 535. Thermal profile graph 500 depicts an increasing internal temperature from left to right on the graph and an increasing fan speed from bottom to top on the graph. For a particular power supply 300, the internal temperature X axis 530 may represent information that internal temperature sensor 351 measures and memory 330 stores as TEMP 350-1. In a similar manner, fan speed Y axis 535 may represent information that fan speed store 360 stores as RPM 360-1 or RPM 360-2. In one embodiment, line 510 corresponds to a thermal profile 340-1 that shows increasing the speed of fan 370 as the internal temperature of power supply 300 increases. Conversely, thermal profile 340-1 shows decreasing fan speed with decreasing internal supply temperature. Line 520 corresponds to a thermal profile 340-2 that shows increasing the speed of fan 370 as the internal temperature of another power supply 300 increases. Conversely, thermal profile 340-2 shows decreasing fan speed with decreasing internal supply temperature.

Referring to FIG. 3, power supply 300 includes multiple thermal profiles 340-1, 340-2, . . . 340-M in its profile store 340. As seen in FIG. 4, the designer or other entity may place or mount a power supply 300 in many different locations within server chassis 300 of server 100. A different address associates with each respective address connector 480 location in server chassis 400. When the designer, manufacturer or other entity mounts a power supply at one of these locations, the power supply senses its location via its respective address connector and, in response to determining its location, the power supply selects a particular corresponding thermal profile from its profile store 340. The selected thermal profile is a thermal profile that is appropriate for that location. The designer may determine multiple thermal profiles wherein each thermal profile is appropriate for a different respective location in the server. While in one embodiment, a particular thermal profile may be appropriate for a particular power supply location, each power supply 300 may include multiple thermal profiles. For example, each of power supplies 300 may include respective thermal profiles for all of the power supply locations in server 100. In that scenario, each power supply 300 stores the same set of thermal profiles in its profile store 340. From these multiple profiles, each power supply 300 selects and employs the particular appropriate thermal profile dependent on the location of that power supply.

Once a server manufacturer installs or mounts a power supply 300 at a particular location and that power supply 300 selects the appropriate thermal profile for that particular location, that power supply continues using that selected thermal profile for the duration of time that the power supply 300 operates at that particular location. If for some reason a technician or other entity moves that power supply 300 to a new location within server chassis 400, then that power supply 300 detects its new location from the connector address of the new location and selects a corresponding new thermal profile that is appropriate for the new location. Power supply 300 makes this selection of a new thermal profile from the multiple thermal profiles 340-1, 340-2, . . . 340-M in profile store 340.

Referring again to FIG. 3 and FIG. 4, during operation of server 100, power supply 300 at one location address in server chassis 400 may sense an increase in power supply internal temperature by monitoring environmental sensor store 350. Environmental sensor store 350 stores the internal temperature reading that store 350 receives from internal temperature sensor 351 as internal TEMP 350-1 data. In response to the sensed increase of internal power supply temperature, power supply 300 may increase the speed of fan 370 to a higher RPM consistent with the selected thermal profile 340-1 shown in FIG. 5 by line 510 on thermal profile graph 500.

Similarly, in response to an internal temperature increase, another power supply 300 at another location address in server chassis 400 may increase the speed of its fan 370 speed to a higher RPM consistent with a different selected thermal profile 340-2 shown by line 520 on thermal profile graph 500. Different power supplies 300 in different location addresses may select and use different respective thermal profiles from their profile stores 340. While in FIG. 5 two thermal profile lines 510 and 520 are shown, in actual practice profile store 340 may include more thermal profiles than illustrated. In one embodiment, profile store 340 includes a respective thermal profile for each possible location address of server chassis 400. In other words the number of thermal profiles, M, may equal the number of location addresses connectors, K, in server chassis 400 in one embodiment. Stated alternatively, in a server chassis 400 that includes K address connectors 480-1, 480-2, . . . 480-K, profile store 340 may include M thermal profiles, wherein M equals K.

In other embodiments, designers or other entities may create thermal profiles (not shown) that include other environmental information in addition to temperature information. For example, those other profiles may reflect input from air pressure sensors 352 and 356, from humidity sensors (not shown), or from other environmental parameters internal to, or external to, power supply 300. Power supply 300 may also use the thermal profile information within profile store 340 to control cooling mechanisms other than fan 370 to cool power supply 300.

Returning to FIG. 5 and referring as well to FIG. 1 and FIG. 3, the dashed lines on thermal profile graph 500 show particular power supply temperature and fan speed relationships for one or more power supplies 300 within server system 100. For example, these dashed lines depict a particular point 540 on line 510 that corresponds to temperature TEMP 350-1 and fan speed RPM 360-1 on their respective axes. Power supply 300, represented in this example as power supply 300-1, reads an internal temperature of TEMP 350-1 from internal temperature sensor 351. More specifically, microcontroller 310 reads TEMP 350-1 from internal temperature sensor 351 via environmental sensor store 350. Based on the sensed location address of the particular power supply 350-1 within server 100, microcontroller 310 selects the appropriate thermal profile from profile store 340. The appropriate thermal profile is the thermal profile that corresponds to the sensed location address.

Assume for discussion purposes that thermal profile 340-1 is the thermal profile that corresponds to the sensed location address of power supply 300-1. Microcontroller 310 accesses the selected thermal profile 340-1 to determine the particular fan speed that corresponds to the TEMP 350-1 data that it receives from environmental sensor store 350. In this example, microcontroller 310 uses thermal profile 340-1 to determine that a fan speed RPM 360-1 corresponds to the current internal supply temperature, TEMP 350-1. Power supply 300 may increase or decrease the speed at which fan 370 rotates to reach a fan speed RPM 360-1 by employing the information within fan speed store 360 to select the fan speed at which fan 370 rotates. In this manner, power supply 300 exhibits the thermal control characteristics that thermal profile 340-1 provides.

Power supply 300-2 mounts in server chassis 300 at a different location address than power supply 300-1 that was discussed above. In response to determining its own location address, power supply 300-2 selects a thermal profile that corresponds to, and is appropriate for, that location address. In this particular example power, supply 300-2 may select thermal profile 340-2, that is shown as line 520 on thermal profile graph 500. Microcontroller 310 accesses the selected thermal profile 340-2 to determine the particular fan speed that corresponds to the TEMP 350-1 data that it receives from environmental sensor store 350. In this example, microcontroller 310 uses thermal profile 340-2 to determine that a fan speed of RPM 360-2 corresponds to the current internal supply temperature, TEMP 350-1. Power supply 300 may increase or decrease the speed at which fan 370 rotates to reach a fan speed RPM 360-2 by employing the information within fan speed store 360 to select the fan speed at which fan 370 rotates. In this manner, power supply 300 exhibits the thermal control characteristics that thermal profile 340-2 provides.

Server system 100 may include multiple power supplies that may each store multiple thermal profiles. In one embodiment, each power supply of server system 100, namely power supplies 300-1, 300-2, . . . 300-N, wherein N is the total number of power supplies within server system 100, stores the same set of thermal profiles. For example, each power supply within server system 100 stores the same thermal profile 340-1, thermal profile 340-2, . . . thermal profile 340-M. In this manner, each power supply of server system 100 has immediate access to all thermal profile information for all of the possible location addresses of power supplies within server system 100.

The graph of FIG. 5 demonstrates how the same power supply 300 may perform differently depending upon the particular physical location of that power supply within server chassis 400. For example power supply 300-1, as shown in FIG. 4, operates within a low restricted air flow location at address connector 480-1. Power supply 300-2 operates within a highly restricted air flow location at address connector 480-2. Power supply 300-1 may employ thermal profile 340-1 as shown by line 510 to manage fan 370 speeds corresponding to internally sensed temperature TEMP 350-1 within power supply 300-1. Power supply 300-2 may employ thermal profile 340-2 as shown by line 520 to manage fan 370 speeds corresponding to internally sensed temperature TEMP 350-1 within power supply 300-2. In other words, power supply 300-1 and power supply 300-2 operate their respective fans 370 at two different speeds, namely RPM 360-1 and RPM 360-2 respectively, to achieve the same or similar internal component temperatures.

This method is particularly useful when a power supply initializes and automatically acquires a thermal profile consistent with that power supply physical location within server system 100 and more particularly within server chassis 400. Each power supply within server system 100 stores thermal profile information appropriate for that power supply's physical location or location address within server chassis 400. When a power supply initializes, resets, or otherwise powers up, that power supply may select a unique thermal profile appropriate for the physical location of that power supply within server chassis 400 of server system 100.

FIG. 6 is a flowchart that shows process flow in an embodiment of the disclosed power supply thermal profile selection methodology that provides thermal profile selection within a power supply of a server system. More specifically, the flowchart of FIG. 6 shows how power supply microcontroller 310 selects particular thermal profiles for a power supply when that power supply initializes within server system 100. The disclosed power supply thermal profile selection method starts, as per block 605.

A designer or other entity determines an appropriate thermal profile for each predetermined power supply physical location in server system 100, as per block 610. In more detail, a designer or other entity generates one or more power supply thermal profiles, such as those of profile store 340 for server system 100. For example, designers may develop thermal profile 340-1, thermal profile 340-2, . . . thermal profile 340-M, wherein M is the total number of thermal profiles within profile store 340. Designers may develop these thermal profiles empirically, through use of models, by simulation or calculation, or by other means, as discussed above.

Microcontroller 310 of power supply 300 stores power supply thermal profile information in profile store 340, as per block 615. For example, profile store 340 may store all thermal profiles 340-1, 340-2, . . . 340-M that correspond to the possible physical locations of power supply 300 in server system 100. In one embodiment, a different thermal profile corresponds to each location address in server system 100. In another embodiment, if server system 100 includes multiple power supplies, each power supply stores an identical collection of thermal profiles. More specifically each power supply, namely power supply 300-1, 300-2, . . . 300-N, wherein N is the total number of power supplies within server system 100, stores an identical collection of thermal profiles, namely thermal profiles 340-1, 340-2, . . . 340-M.

A manufacturer or other entity may produce a particular power supply 300 with all thermal profiles pre-loaded in profile store 340 of memory 340. In one embodiment, each power supply of server system 100 maintains duplicate or identical thermal profile information. In other embodiments, individual power supplies may maintain unique, i.e., different thermal profile information from other power supplies of server system 100.

One of multiple power supplies, such as power supply 300-1, 300-2, . . . 300-N, initializes and determines its unique location address, as per block 620. This enables power supply 300 to determine its physical location within server system 100. For example, a power supply such as power supply 300-1 may employ addressable connector 380-1 to determine this power supply's unique location address. Power management controller 110 of FIG. 1 may supply connector 480-1 and its mating connector 380-1 of power supply 300-1 with a unique location address. By reading this unique location address from address connector 380-1, power supply 300-1 is able to determine the physical location of power supply 300-1 in server chassis 400. In one embodiment, server system 100 may include a backplane motherboard (not shown) into which each power supply plugs. In one embodiment, each addressable connector 380-1, 380-2, ... 380-N may employ uniquely identifiable pin signals, such as shorts and opens, that determine a particular address and corresponding physical location within server chassis 400. In other embodiments, server system 100 may employ other addressing methods to determine a unique location address for each particular power supply 300 upon initialization of that particular power supply.

In response to the power supply 300-1 determining its location address, the power supply microcontroller 310 accesses profile store 340 and selects a thermal profile that corresponds to the determined location address of power supply 300-1, as per block 625. Server system 100 performs a test to determine if there are any more power supplies to initialize, as per block 630. If server system 100 determines that there are more power supplies to initialize, flow continues to block 620, and the power supply thermal profile selection method continues. However, if there are no more power supplies to initialize within server system 100, then each power supply 300 is ready to commence full operation. In that case, each power supply 300 senses a local environmental condition such as internal or external power supply temperature, as per block 635. Each power supply 300 manages its cooling element 370 in accordance with the selected thermal profile for that power supply 300 and the sensed local environmental condition for that power supply 300, as per block 640.

In other embodiments, power supply 300 may employ other sensors such as external air pressure sensor 356, or other sensors (not shown) to determine the best thermal profile fit. Power supply 300 may take into account historical environmental sense information, thermal profile selection history, or other information to determine the best thermal profile fit at time of initialization. In one embodiment, power supply 300 may include a default thermal profile. Power supply 300 may select the default thermal profile from within profile store 340 upon initialization and modify or select a different thermal profile dynamically during operation at a later time.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method, comprising:
    sensing, by a power supply, a location address that corresponds to a physical location of the power supply within an electronic system, thus providing a sensed location address, the electronic system including a plurality of power supply locations with respective location addresses;
    selecting, by the power supply, one of a plurality of thermal profiles based on the sensed location address to provide a selected thermal profile;
    sensing, by the power supply, a local environmental condition of the power supply, thus providing sensed local environmental condition information; and
    activating, by the power supply, a cooling element associated with the power supply in response to the selected thermal profile and the sensed local environmental condition, the power supply instructing the cooling element to provide an amount of cooling dependent on both the selected thermal profile and the sensed environmental condition.

2. The method of claim 1, wherein the local environment condition information includes temperature of the power supply.

3. The method of claim 1, wherein the local environment condition information includes air pressure information at the power supply.

4. The method of claim 1, wherein the local environment condition information includes air flow impedance at the power supply.

5. The method of claim 1, wherein the sensed location address is one of a plurality of location addresses, each location address being associated with a different physical location that the power supply may occupy in the electronic system.

6. The method of claim 1, wherein the electronic system is a server information handling system that includes a plurality of power supply locations.

7. The method of claim 1, further comprising storing, by the power supply, the plurality of thermal profiles in a memory store in the power supply.

8. A method, comprising:
    sensing, by each power supply of a plurality of power supplies in an electronic system, a respective location address that corresponds to a physical location of each power supply within the electronic system, each power supply thus exhibiting a sensed location address;
    selecting, by each power supply, one of a plurality of thermal profiles based on the sensed location address of each power supply to provide a respective selected thermal profile for each power supply;
    sensing, by each power supply, a respective local environmental condition of each power supply, thus providing a respective sensed local environmental condition information for each power supply; and
    activating, by each power supply, a respective cooling element associated with each power supply in response to the respective selected thermal profile and the respective sensed local environmental condition of each power supply, each power supply instructing the respective cooling element to provide an amount of cooling dependent on both the selected thermal profile and the sensed environmental condition for each power supply.

9. The method of claim 8, wherein the local environment condition information includes temperature of each power supply.

10. The method of claim 8, wherein the local environment condition information includes air pressure information at each power supply.

11. The method of claim 8, wherein the local environment condition information includes air flow impedance at each power supply.

12. The method of claim 8, wherein the electronic system is a server information handling system that includes a plurality of power supply locations.

13. The method of claim 8, further comprising storing, by each power supply, the plurality of thermal profiles in a memory store in each power supply.

\* \* \* \* \*